United States Patent
Yamaoka et al.

(10) Patent No.: US 8,290,685 B2
(45) Date of Patent: Oct. 16, 2012

(54) CONTROL DEVICE FOR ENGINE

(75) Inventors: Shiro Yamaoka, Hitachi (JP); Yoshihiro Sukegawa, Hitachi (JP); Noboru Tokuyasu, Hitachinaka (JP); Hiroaki Hoshika, Hitachiomiya (JP); Daisuke Terada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 23 days.

(21) Appl. No.: 12/920,558

(22) PCT Filed: Jul. 24, 2009

(86) PCT No.: PCT/JP2009/003494
§ 371 (c)(1),
(2), (4) Date: Sep. 1, 2010

(87) PCT Pub. No.: WO2010/032356
PCT Pub. Date: Mar. 25, 2010

(65) Prior Publication Data
US 2011/0166768 A1    Jul. 7, 2011

(30) Foreign Application Priority Data

Sep. 22, 2008  (JP) ................................. 2008-242453

(51) Int. Cl.
*F02D 41/00*  (2006.01)
*F01N 3/00*  (2006.01)
(52) U.S. Cl. ......................... 701/103; 60/285; 73/114.69
(58) Field of Classification Search .................. 701/103, 701/104, 109, 110, 113–115; 123/396, 403, 123/479, 676, 688, 690, 694, 695, 568.17, 123/568.21, 568.22, 568.31; 60/276–278, 60/285, 295, 297, 299, 301, 605.1; 73/114.69–114.73, 114.76; 702/182–185
See application file for complete search history.

(56) References Cited

U.S. PATENT DOCUMENTS
6,209,517 B1    4/2001  Yasui
(Continued)

FOREIGN PATENT DOCUMENTS
JP    8-128317 A    5/1996
(Continued)

OTHER PUBLICATIONS
International Search Report with English translation dated Aug. 18, 2009 (Four (4) pages).

*Primary Examiner* — John T. Kwon
*Assistant Examiner* — Johnny Hoang
(74) *Attorney, Agent, or Firm* — Crowell & Moring LLP

(57) ABSTRACT

A control device for an engine, capable of accurately estimating the quantity of exhaust heat from the engine and performing engine control which improves the exhaust quality and fuel consumption of the engine in various operating conditions thereof, by using the accurate estimated value of the quantity of exhaust heat. A control device for an engine is provided with an exhaust flow rate sensor for directly sensing the flow rate of exhaust gas discharged from the engine, an exhaust temperature estimating device for sensing or estimating the temperature of the exhaust gas discharged from the engine, and an exhaust heat quantity estimating device for estimating, based on an output of the exhaust flow rate sensor and an output of the exhaust temperature estimating device, the quantity of heat of the exhaust gas discharged from the engine.

10 Claims, 6 Drawing Sheets

U.S. PATENT DOCUMENTS

| | | | |
|---|---|---|---|
| 6,993,428 B1 * | 1/2006 | Gundrum | 701/114 |
| 7,059,117 B2 * | 6/2006 | Ripper et al. | 60/286 |
| 2002/0157386 A1 * | 10/2002 | Hiranuma et al. | 60/295 |
| 2003/0070423 A1 | 4/2003 | Morinaga et al. | |
| 2007/0256408 A1 | 11/2007 | Kogo et al. | |
| 2009/0038595 A1 * | 2/2009 | Arlt et al. | 123/676 |
| 2009/0071420 A1 * | 3/2009 | Huber et al. | 123/3 |
| 2009/0107116 A1 * | 4/2009 | Barber et al. | 60/286 |
| 2009/0141768 A1 * | 6/2009 | He et al. | 374/144 |
| 2009/0313992 A1 * | 12/2009 | Pearson | 60/605.2 |
| 2010/0126433 A1 * | 5/2010 | Kozaki | 122/451 R |
| 2010/0155315 A1 * | 6/2010 | Partridge et al. | 210/149 |
| 2011/0005503 A1 * | 1/2011 | Harden et al. | 123/568.12 |

FOREIGN PATENT DOCUMENTS

| | | |
|---|---|---|
| JP | 2000-110657 A | 4/2000 |
| JP | 2003-201906 A | 7/2003 |
| JP | 2003-254038 A | 9/2003 |
| JP | 2006-63905 A | 3/2006 |
| JP | 2006-170004 A | 6/2006 |

* cited by examiner

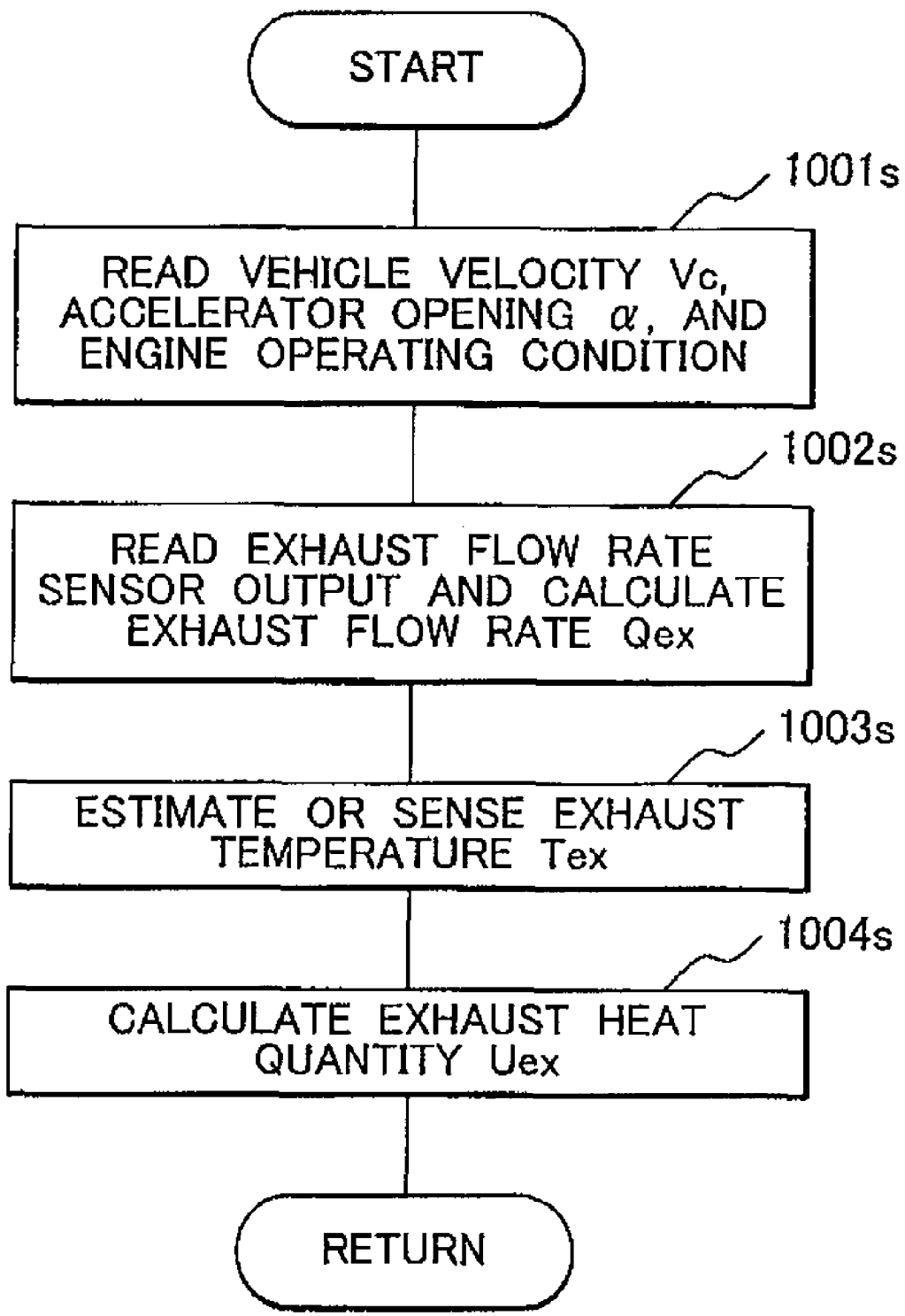

CONTROL DEVICE FOR ENGINE

TECHNICAL FIELD

The present invention relates to an engine control device which determines the quantity of exhaust heat from an engine and controls the engine using the exhaust heat quantity.

BACKGROUND ART

As means for reducing the exhaust from, for example, a diesel engine or the like, there is known technology of using a catalyst (hereinafter referred to as a catalyst (diesel particulate filter: hereafter it's called as "DPF") that captures soot and purifies the same, in particular, contained in exhaust. The DPF captures soot contained in the exhaust from the engine during normal operation of the engine. When the DPF is to be purified, the exhaust temperature is raised (preferably to 600° C. or higher) and the soot contained in the exhaust is burned by an oxidant (oxygen) contained in the exhaust. In order to efficiently purify the soot contained in the exhaust, it is a key point to accurately grasp the quantity of exhaust heat and the concentration of oxygen to be provided for the DPF to control the exhaust heat quantity and the oxygen concentration. In technology disclosed in patent document 1, for example, the exhaust heat quantity is estimated based on the output value of an intake air flow rate sensor and the quantity of fuel injection (quantity given by a control command) and, a catalyst such as a DPF or the like is controlled based on the estimated exhaust heat quantity.

PRIOR ART DOCUMENT

Patent Document

Patent document 1: Japanese Patent Laid-Open No. 2003-254038

SUMMARY OF THE INVENTION

Problems to be Solved by the Invention

In a conventional exhaust heat quantity estimating method, the flow rate of exhaust flowing through a DPF is estimated based on such as a value sensed with an air flow sensor installed in an upstream portion of an intake pipe or the like. With such an exhaust heat quantity estimating method, however, it is difficult to accurately estimate the actual exhaust flow rate because there is a certain distance (via an engine body) between an installed position of the air flow sensor and an installed position of the DPF and also because there is blow-by gas coming in. In the case of a diesel engine in particular, the engine tends to deteriorate in performance or be contaminated easily, and the engine deterioration and the contamination effect variability in blow-by gas quantity and the exhaust temperature. This makes it further difficult to accurately estimate the flow rate and the heat quantity of exhaust flowing through the DPF.

Further when exhaust purification is carried out based on an estimated value of the exhaust heat quantity, the accuracy of the estimated value of the exhaust heat quantity is since low, the exhaust condition and the engine operating time for exhaust purification mode is determined with error. When the exhaust purification mode is prolonged, more fuel is consumed causing not only the quality of exhaust but also fuel efficiency to be deteriorated.

To solve the above problem, the present invention is to provide an engine control device which can accurately estimate the exhaust heat quantity from an engine to realize various engine control based on an accurately estimated exhaust heat quantity.

Means for Solving the Problems

To achieve the above object, an engine control device of the present invention is characterized by comprising: an exhaust flow rate sensor that directly senses a flow rate of exhaust from an engine; an exhaust temperature estimating device that senses or estimates a temperature of exhaust from the engine; and an exhaust heat quantity estimating device that estimates an quantity of exhaust heat from the engine based on an output of the exhaust flow rate sensor and an output of the exhaust temperature estimating device.

From the viewpoint of responsiveness and contamination resistance, the exhaust flow sensor is preferably a hot-wire flow sensor.

Further by providing the control device with an exhaust temperature estimating device that estimates exhaust temperature downstream of the DPF, and by comparing an output value of the exhaust temperature estimating device to the output value of the exhaust flow rate sensor installed upstream of the DPF, it is possible to accurately estimate a quantity of heat transferred in the DPF. This makes it possible to grasp the condition of purification or deterioration inside the DPF.

Advantages of the Invention

According to the present invention, the quantity of exhaust heat from an engine can be accurately estimated, so that engine control can be performed based on an accurately estimated exhaust heat quantity to improve exhaust quality and fuel efficiency under various operating conditions of the engine.

BRIEF DESCRIPTION OF THE DRAWINGS

FIG. 2(*b*) is a conceptual diagram of a method of measurement by a hot-wire flow rate sensor.

FIG. 3 is a flowchart for calculating an exhaust heat quantity.

BEST MODE FOR CARRYING OUT THE INVENTION

Preferred embodiments of the present invention will be described below with reference to the attached drawings.

Figure 1:
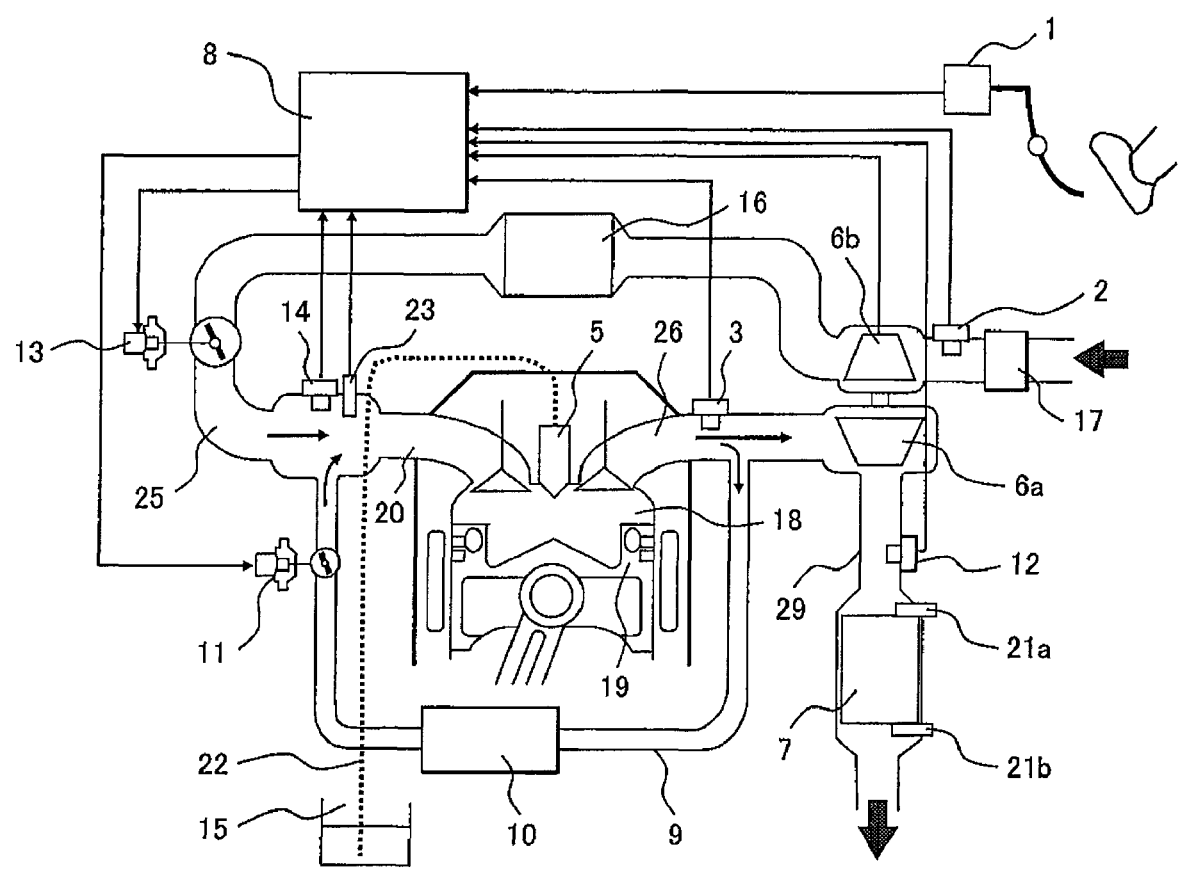
FIG. 1 is a block diagram of an engine control device according to a first embodiment of the present invention.

FIG. 1 is a block diagram of a control device for an engine (internal combustion engine) according to a first embodiment of the present invention. As shown in FIG. 1, the engine control device comprises an engine 19, an air intake system and an exhaust system both attached to the engine 19, and an engine control unit (ECU).

The air intake system of the engine 19 includes an air cleaner 17, an air flow sensor 2 for sensing the flow rate of intake air, a compressor 6b of a supercharger, an intercooler 16, a throttle 13 for controlling the intake air flow rate, and an intake airport 20, and they are arranged in the mentioned order from the upstream toward the downstream. An intake air pressure sensor 14 is disposed inside or near the intake port 20. The exhaust system of the engine 19 includes an exhaust port 26, a λ sensor 3 for sensing the oxygen concentration in exhaust, an exhaust turbine 6a of the supercharger, an exhaust flow rate sensor 12 for directly sensing the exhaust flow rate, a DPF 7 for exhaust purification, and differential pressure sensors 21a and 21b for sensing the difference between pressures upstream and downstream of the DPF 7, and they are arranged in the mentioned order from the upstream toward the downstream along an exhaust pipe 29.

An exhaust gas recirculation (EGR) passage 9 for recirculating exhaust to the intake port 20 is provided between the exhaust port 26 and the intake port 20 of the engine 19. The EGR passage 9 is provided with an EGR cooler 10 and an EGR control valve 11.

The ECU 8 is connected to an accelerator opening sensor 1, the air flow sensor 2, the λ sensor 3, the compressor 6b, the EGR control valve 11, the exhaust flow rate sensor 12, the throttle 13, and the intake air pressure sensor 14, so that the ECU 8 determines, for the engine 19, the operating condition and the amount of control in accordance with user requests such as the accelerator opening α and braking condition, vehicle conditions such as traveling speed, and engine conditions such as engine coolant temperature and exhaust temperature.

The engine 19 is provided with a fuel injection valve (hereinafter referred to as an "injector") 5 for injecting fuel directly into a combustion chamber 18. The injector 5 is connected to a fuel tank 15 via a fuel pipe 22. Fuel is fed from the fuel tank 15 to the injector 5 through the fuel pipe 22 using a feed pump (not illustrated) provided in the fuel tank 15 and a high-pressure fuel pump (not illustrated) provided between the fuel pipe 22 and the injector 5. Fuel is injected into the combustion chamber 18 at prescribed intervals by a required fuel quantity, wherein the required fuel quantity is determined according to a target engine torque calculated based on an opening signal α from the accelerator opening sensor 1. The quantity of fuel to be injected is appropriately corrected according to an opening signal θtp from the throttle 13, an opening signal θegr from the EGR control valve 11, boost pressure Ptin of the compressor 6b, and an output value of the λ sensor 3.

The λ sensor 3 is of a sensor for measuring the air fuel ratio of exhaust from the engine. Instead of the λ sensor 3, an oxygen sensor or $CO_2$ sensor capable of estimating the oxygen concentration in exhaust may be used as an oxygen concentration estimating device. The throttle 13 is preferably an electronically controlled throttle, i.e. a throttle valve driven by an electric actuator.

The present control device is provided with an exhaust temperature estimating device for sensing or estimating the exhaust temperature. The exhaust temperature estimating device may be an exhaust temperature sensor disposed downstream from the DPF 7 to sense the exhaust temperature. It may also be a different type of sensor capable of estimating the exhaust temperature (for example, an exhaust flow rate sensor 12).

The exhaust flow rate sensor 12 is of a sensor for directly sensing the exhaust flow rate with a sensing period not exceeding one cycle period under various engine operating conditions. It is preferably a hot-wire flow rate sensor or an electromagnetic flow rate sensor, so that the exhaust flow rate can be highly accurately sensed for use in controlling the engine. In the present embodiment, a hot-wire flow rate sensor is used as the exhaust flow rate sensor 12.

Figure 2A:
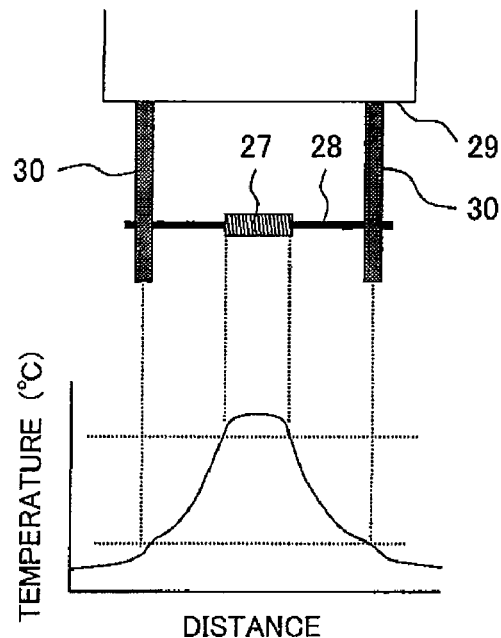
FIG. 2(*a*) is a schematic diagram showing a construction of a hot-wire flow rate sensor.
Figure 2B:
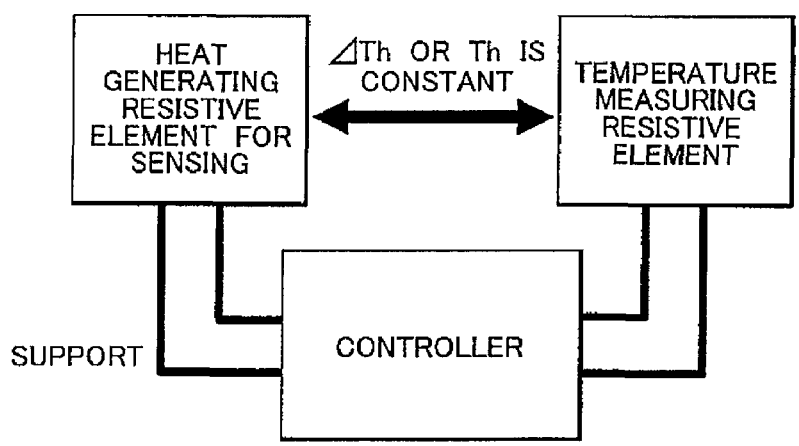

The principle of a hot-wire flow rate sensor will be explained based on FIG. 2. A hot-wire flow rate sensor makes use of two temperature sensitive resistive elements having temperature dependence. One of the two temperature sensitive resistive elements is a temperature measuring resistive element for sensing the temperature of a target gas and the other is a heat generating resistive element for sensing which is set to a high temperature relative to the temperature measuring resistive element. The temperature sensitive resistive elements used as the heat generating resistive element and temperature measuring resistive element each includes, for example as shown in FIG. 2(a), a resistance wire (hot wire) 27 wound on a bobbin and lead wires 28 connected to both ends of the resistance wire 27. The heat generating resistive element and the temperature measuring resistive element have different resistance values. These temperature sensitive resistive elements are supported by resistive element supports 30 in the exhaust pipe 29. As shown in FIG. 2(b), the control circuit controls the electric currents applied to the temperature measuring resistive element and heat generating resistive element such that the temperature difference between (or the temperatures of) the two resistive elements becomes constant. The gas flow rate is determined based on the quantity of electric current applied to the resistive elements. Hot-wire flow rate sensors have good output responsiveness to changes in gas flow rate and most of the intake air flow meters presently used in automobiles are hot-wire flow rate sensors.

As to flow rate sensors, the output characteristic deterioration caused by contamination is a serious problem to be solved for flow rate sensors whether for use in an intake-air environment or in an exhaust environment. Particularly, when contaminants such as particulate matter (PM) adhere to a hot wire 27, the output of the flow rate sensor largely varies, and thereby making it impossible to accurately sense the flow rate of gas. In the present embodiment, to prevent such contamination, the hot wire 27 used in the exhaust flow rate sensor 12 is temporarily heated to a temperature at which PM is burned off. This burns off contaminants such as PM adhering to the hot wire 27 and also prevents new contaminants and exhaust condensate water from adhering to the hot wire 27. The temperature to which the hot wire 27 is heated to burn off PM is preferably 600° C. or higher in view of the Leidenfrost effect that prevents contaminant adherence. The flow sensor is, therefore, required to have a structure which can withstand such a high temperature environment, but, since the exhaust condition varies from engine to engine, the temperature is not limited to 600° C. or higher.

Next, a calculating method for the exhaust heat quantity with the exhaust flow sensor 12 will be explained below.

FIG. 3 is a flowchart for calculating the exhaust heat quantity according to the present embodiment. First of all, velocity Vc, accelerator opening α, and engine operating condition as to the vehicle mounted with the engine 19 are read (block 1001s), the output value of the exhaust flow rate sensor 12 is read, and exhaust flow rate Qex is calculated based on the data read in (block 1002s). Next, exhaust temperature Tex is sensed or estimated (block 1003s) and the exhaust heat quantity Uex is calculated based on exhaust flow rate Qex and exhaust temperature Tex (block 1004s). In block 1004s, the exhaust heat quantity Uex is calculated using equation (1) shown below.

$$Uex = Cp \cdot Qex \cdot Tex \qquad \text{Eq. (1)}$$

where Cp is a constant-pressure specific heat of exhaust calculated based on such values as a command value for fuel injection quantity, the output value of the air flow sensor 2, and the output value of the λ sensor 3. The constant-pressure specific heat Cp of exhaust can be estimated with high accuracy without differing much from a real value, so that applying an estimated value to the calculation does not result in a large error. Exhaust temperature Tex can be calculated based on the output value of the temperature measuring resistive element included in the exhaust flow rate sensor 12 shown in FIG. 2. Provided that an exhaust temperature sensor is provided in the exhaust pipe 29, the output value of the exhaust temperature sensor may be used. An alternative method may also be used in which two heat generating resistive elements with different temperature settings are provided and the exhaust temperature is theoretically determined based on the quantity of power supplied to each of the two heat generating resistive elements and exhaust flow rate Qex sensed by each of the two heat generating resistive elements.

The control device for an engine according to the present embodiment can determine the exhaust heat quantity Uex with high accuracy and in a simple manner by calculation based on an exhaust flow rate value directly sensed by the exhaust flow rate sensor 12.

The ECU 8, for example, may be provided with an engine parameter storage device for storing parameters for controlling the engine 19, and a target quantity of exhaust heat corresponding to each engine operating condition may be set beforehand in the engine parameter storage device. Thereby, the ECU 8 may control the compressor 6(b), inter cooler 16, and throttle 13 or injector 5 so that the exhaust heat quantity estimated based on the output value of the exhaust flow rate sensor 12 becomes equal to the target exhaust heat quantity.

Figure 4:
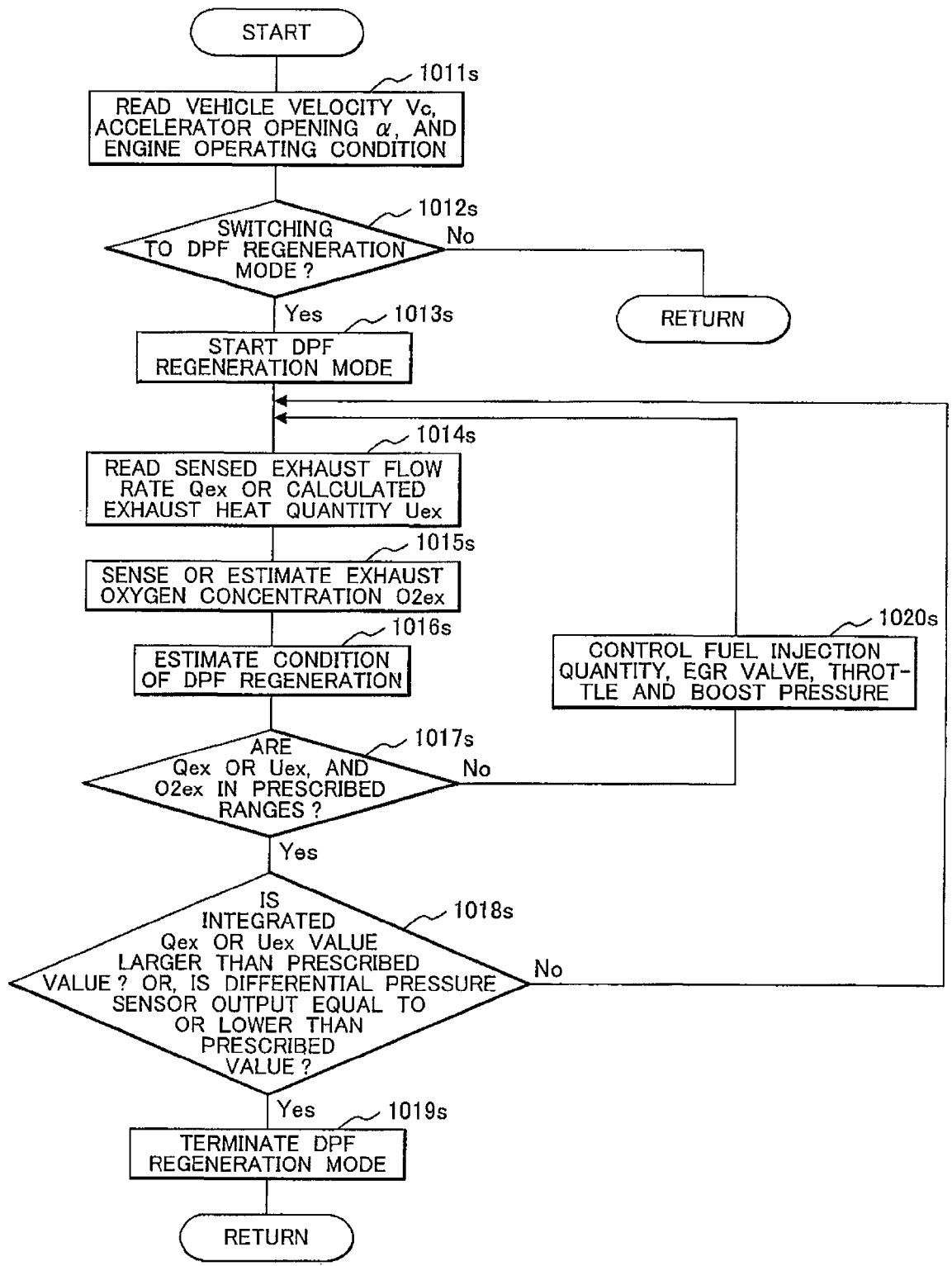
FIG. 4 is a control flowchart for control in DPF regeneration mode.

FIG. 4 is a control flowchart for purifying/regenerating the DPF 7 by using the exhaust flow rate sensor 12 in the control device for an engine according to the present embodiment. First of all, velocity Vc, accelerator opening α, and engine operating condition as to the vehicle mounted with the engine 19 are read (block 1011s), and whether to switch the engine operation to DPF regeneration mode is determined (block 1012s). When, with adequate soot captured in the DPF 7, it is determined to switch to the DPF regeneration mode, the DPF regeneration mode is started (block 1013s).

In the DPF regeneration mode, exhaust flow rate Qex sensed by the exhaust flow rate sensor 12 or the exhaust heat quantity Uex calculated from Qex is read (block 1014s), exhaust oxygen concentration $O_2$ex is estimated or sensed (block 1015s), and the condition of DPF regeneration is estimated (block 1016s). Estimating exhaust oxygen concentration $O_2$ex in block 1015s is for estimating the quantity of oxidant flowing into the DPF. The $O_2$ex value is estimated or sensed preferably using a value directly sensed and outputted by the λ sensor 3. It has been known that estimating $O_2$ex based on an exhaust oxygen concentration value estimated from the quantity of fuel injection and a value outputted by the air flow sensor 2 does not much affect the error in estimating the exhaust heat quantity.

Next, whether Qex or Uex, and $O_2$ex are within respective prescribed value ranges is determined (block 1017s). When any of Qex or Uex, and $O_2$ex is not within the corresponding prescribed value range (1017s→No), engine operation parameters (such as fuel injection quantity, opening of the EGR control valve, throttle opening, and boost pressure) are controlled (block 1020s) to bring Qex or Uex, and $O_2$ex into the respective prescribed value ranges. The prescribed value ranges are designed to clean (burn off) the soot captured in the DPF 7 at high temperature and, thereby, optimally purify/regenerate the DPF 7. They are set in the ECU 8 beforehand.

When Qex or Uex, and $O_2$ex are within the respective prescribed value ranges (1017s→Yes), whether or not the integrated output value of Qex or Uex, which is integrated since when the DPF regeneration mode has been started, is larger than the prescribed value therefor or whether or not the output value of the differential pressure sensor 21a or 21b is equal to or lower than the prescribed value is determined (block 1018s). This determination is done for the purpose of determining the condition of DPF regeneration (i.e. to determine whether or not the soot in the DPF has been purified). The prescribed integrated output values of Qex and Uex represent the exhaust heat quantity and oxidant quantity respectively required for DPF regeneration. They are set in the ECU 8 beforehand. When the output values of the differential pressure sensors 21a and 21b are equal to or lower than the respective prescribed values therefor, it can be determined that the soot causing a differential pressure between upstream and downstream of the DPF has been adequately purified. Therefore, whether the DPF regeneration mode may be terminated is determined depending on whether or not the integrated output value of Qex or Uex is larger than the prescribed value therefor or whether or not the output value of the differential pressure sensor 21a or 21b is equal to or lower than the prescribed value. When it is determined that the DPF regeneration mode may be terminated, i.e. when the soot is determined to have been adequately purified, the DPF regeneration mode is terminated (block 1019s).

Using the flowchart shown in FIG. 4 makes it possible to purify the DPF by accurately supplying a required exhaust heat quantity to the DPF and determine an optimum time of terminating the DPF regeneration mode. This enables engine control without deteriorating exhaust quality or fuel efficiency.

Before starting or after terminating the DPF regeneration mode, it is advisable to prohibit estimating the exhaust heat quantity based on the output value of the exhaust flow rate sensor 12 and perform regeneration control for the exhaust flow rate sensor 12. When using the hot-wire exhaust flow rate sensor, the regeneration control is performed such a manner that the measuring surface of the sensor is preferably heated to 650° C. or higher to thereby burn off or remove contaminants such as soot and soluble organic fractions (SOFs) adhering to the hot-wire surface. This prevents the exhaust flow rate error from enlarging due to performance deterioration of the exhaust flow rate sensor 12, so that the exhaust heat quantity can be accurately determined.

Figure 5:
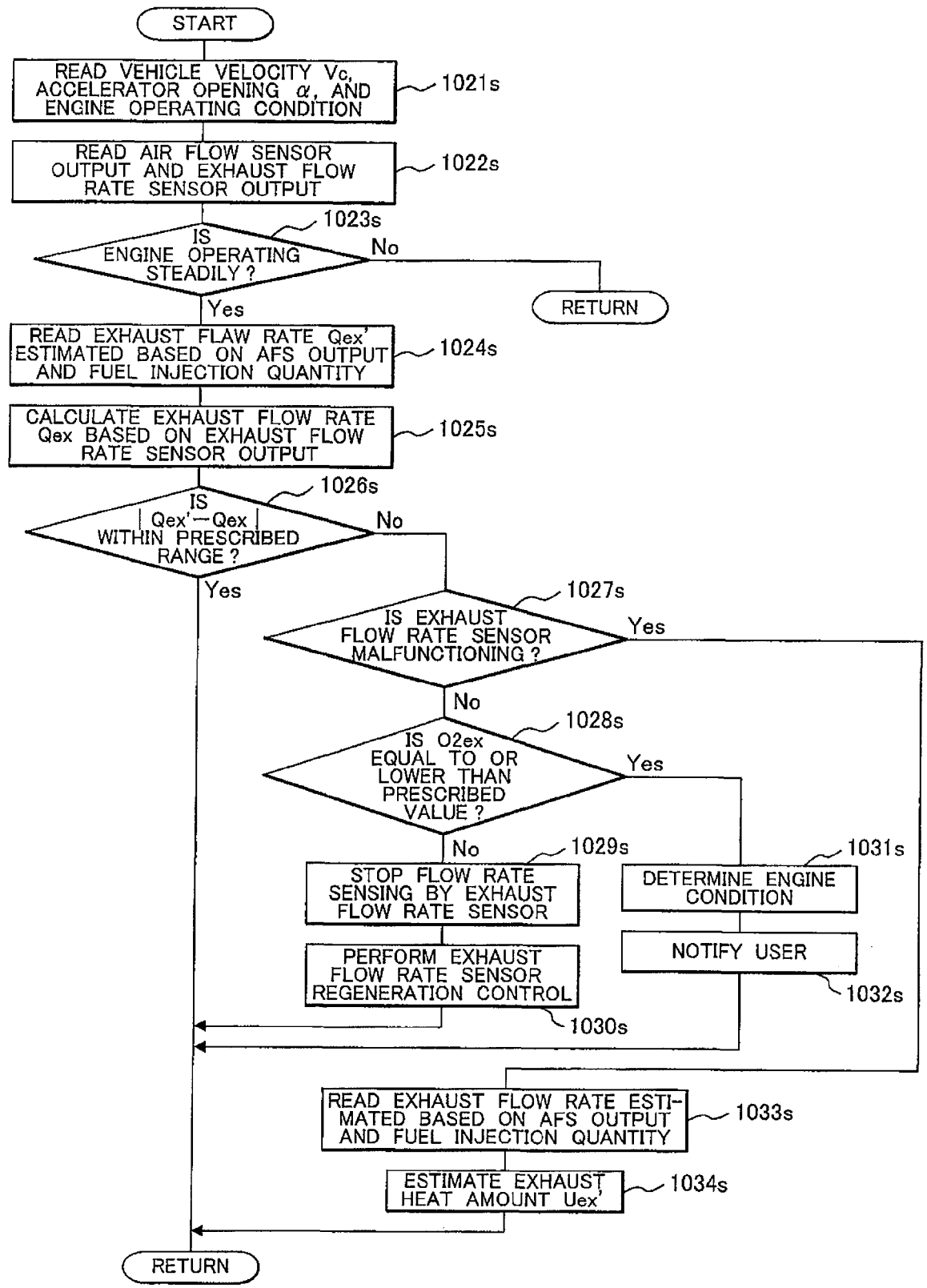
FIG. 5 is a control flowchart for determining malfunctioning of an exhaust flow rate sensor, performing regeneration control for a DPF, and diagnosing the condition of engine operation.

FIG. 5 is a control flowchart for determining malfunction (deterioration) of the exhaust flow rate sensor, performing regeneration control for the DPF 7, and diagnosing the condition of engine operation using the control device according to the present embodiment. The exhaust flow rate and the exhaust heat quantity explained with reference up to FIG. 4 represent values determined based on the output value of the exhaust flow rate sensor 12. For this reason, it is necessary to keep monitoring whether the sensing accuracy of the exhaust flow rate sensor 12 is within a prescribed range (i.e. whether the exhaust flow rate sensor 12 is functioning normally) and diagnosing whether the engine is operating in desired condition.

As shown in FIG. 5, velocity Vc, accelerator opening α, and engine operating condition as to the vehicle mounted with the engine 19 are read (block 1021s), the output values of the air flow sensor 2 and the exhaust flow rate sensor 12 are read (block 1022s), and whether or not the engine 19 is operating in a steady state is determined (block 1023s). The procedure for diagnosing and determining the operating condition of the engine according to this flowchart cannot be performed during a transient period of engine operation. Therefore, only when it is determined that the engine is operating in a steady state (1023s→Yes), exhaust flaw rate Qex' estimated, for example, based on the output value of the air flow sensor 2 and the quantity of fuel injection is read (block 1024s), and exhaust flaw rate Qex is calculated based on a normative value directly sensed and outputted by the exhaust flow rate sensor 12 (block 1025s).

Namely, the present embodiment is provided with: a first exhaust heat quantity estimating device for estimating a first exhaust flow rate Qex based on an output value of the exhaust flow rate directly sensed with the exhaust flow rate sensor 12 and the exhaust temperature; and a second exhaust heat quantity estimating device for estimating a second exhaust flow rate Qex' based on an output value of the air flow rate sensed by the air flow sensor 2 and the exhaust temperature. Qex' and Qex are compared to each other, the comparing is used for determining malfunction of the exhaust flow rate sensor 12, controlling DPF regeneration, and diagnosing the condition of engine operation. Incidentally, since the estimation of the exhaust flow rate in block 1024s is for determining whether or not the output value of the exhaust flow rate sensor 12 is normal, so that it may be replaced by the exhaust flow rate Qex' estimated based on the output value of the intake air pressure sensor 14, the opening of the throttle 13, and the opening of the EGR control valve 11.

When, as a result of comparing values between Qex' and Qex, the absolute value of difference therebetween exceeds a prescribed value therefor (block 1026s→Yes), determination is done as to whether or not the exhaust flow sensor 12 is malfunctioning (block 1027s). The determination of malfunction is preferably done based on diagnosis which is done by real time-analyzing of changes in current-carrying characteristics or by real time-analyzing output waveforms (real-time determination of engine operating condition). But a different method may also be used as long as malfunctioning of the exhaust flow rate sensor 12 can be determined.

When the exhaust flow rate sensor 12 is determined to be malfunctioning (1027s→Yes), the output value of the exhaust flow rate sensor 12 cannot subsequently be used in estimating the exhaust flow rate, so that Qex' is used as an estimated exhaust flow rate (block 1033s). Based on the estimated exhaust flow rate Qex', the exhaust heat quantity Uex' is calculated (block 1034s) and the calculated exhaust heat quantity is used to control the engine 19 and the DPF regeneration mode.

When it is determined that the exhaust flow rate sensor 12 is not malfunctioning (1027s→No), exhaust oxygen concentration $O_2$ex is estimated, for example, from the output value of the λ sensor 3, and whether or not the estimated value is equal to or lower than the corresponding prescribed value is determined therefor (block 1028s). When $O_2$ex is determined to be equal to or lower than the prescribed value (1028s→Yes), it can be determined that the quantity of oxygen contained in exhaust is smaller than usual. This indicates that the quantity or proportion of blow-by gas contained in exhaust has increased.

As an increase of blow-by gas may indicate deterioration of the condition of an engine oil passage or cooling water quality, when the result of block 1028s is Yes, the condition of the engine is determined (block 1031s) and a notice urging the user to replace or inspect the engine is issued (block 1032s).

When the exhaust oxygen concentration $O_2$ex is determined to be higher than the corresponding prescribed value therefor (1028s→No), it is determined that the exhaust flow rate sensor 12 is temporarily malfunctioning, for example, due to contamination. Flow rate sensing by the exhaust flow rate sensor 12 is then stopped (block 1029s) and regeneration control for the exhaust flow rate sensor is performed as described above (block 1030s). When using a hot-wire exhaust flow rate sensor, the regeneration control is performed by setting the measuring surface of the sensor at preferably 650° C. of heating temperature or higher so as to burn off or remove contaminants such as soot and soluble organic fractions (SOFs) adhering to the hot-wire surface.

The control device for an engine according to the present embodiment can appropriately determine the conditions of the engine and the exhaust flow rate sensor 12 based on the flowchart shown in FIG. 5 so as to allow the engine to continue operation without largely deteriorating engine performance indicated by exhaust quality and fuel efficiency.

A control device for an engine according to a second embodiment of the present invention will be described below.

Figure 6:
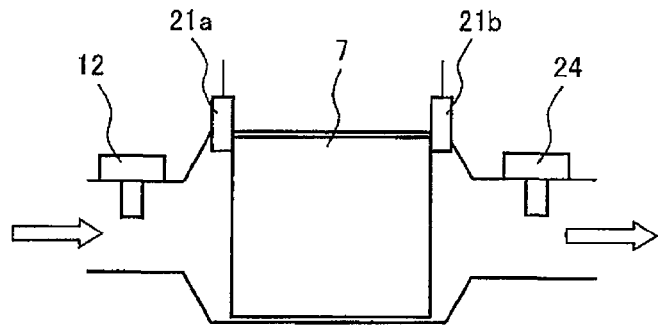
FIG. 6 is a cross-sectional schematic diagram of an essential part of a control device for an engine according to a second embodiment of the present invention.

FIG. 6 is a cross-sectional schematic diagram of an essential part of the exhaust pipe 29 according to the second embodiment in the vicinity of the DPF 7. As shown in FIG. 6, the engine control device of the second embodiment differs from that of the first embodiment in that it has an exhaust flow rate sensor 24 disposed downstream of the DPF 7 in addition to the exhaust flow sensor disposed upstream of the DPF 7. In the case of the first embodiment, when the exhaust temperature sensor is required as an exhaust temperature estimating device, the exhaust flow rate sensor 24 may be installed instead of the exhaust temperature sensor.

When estimating the condition of DPF regeneration as described at block 1016s shown in FIG. 4, providing the exhaust flow rate sensor 24 downstream of the DPF makes it possible to estimate the exhaust temperature by using the output value of a temperature measuring resistive element included in the exhaust flow rate sensor 24. In the present embodiment, in stead of that, the condition of the DPF can be diagnosed more accurately by using the exhaust flow rate sensor 24 that can directly sense the exhaust flow rate downstream of the DPF and calculating exhaust heat quantity Uex" downstream of the DPF.

Figure 7:
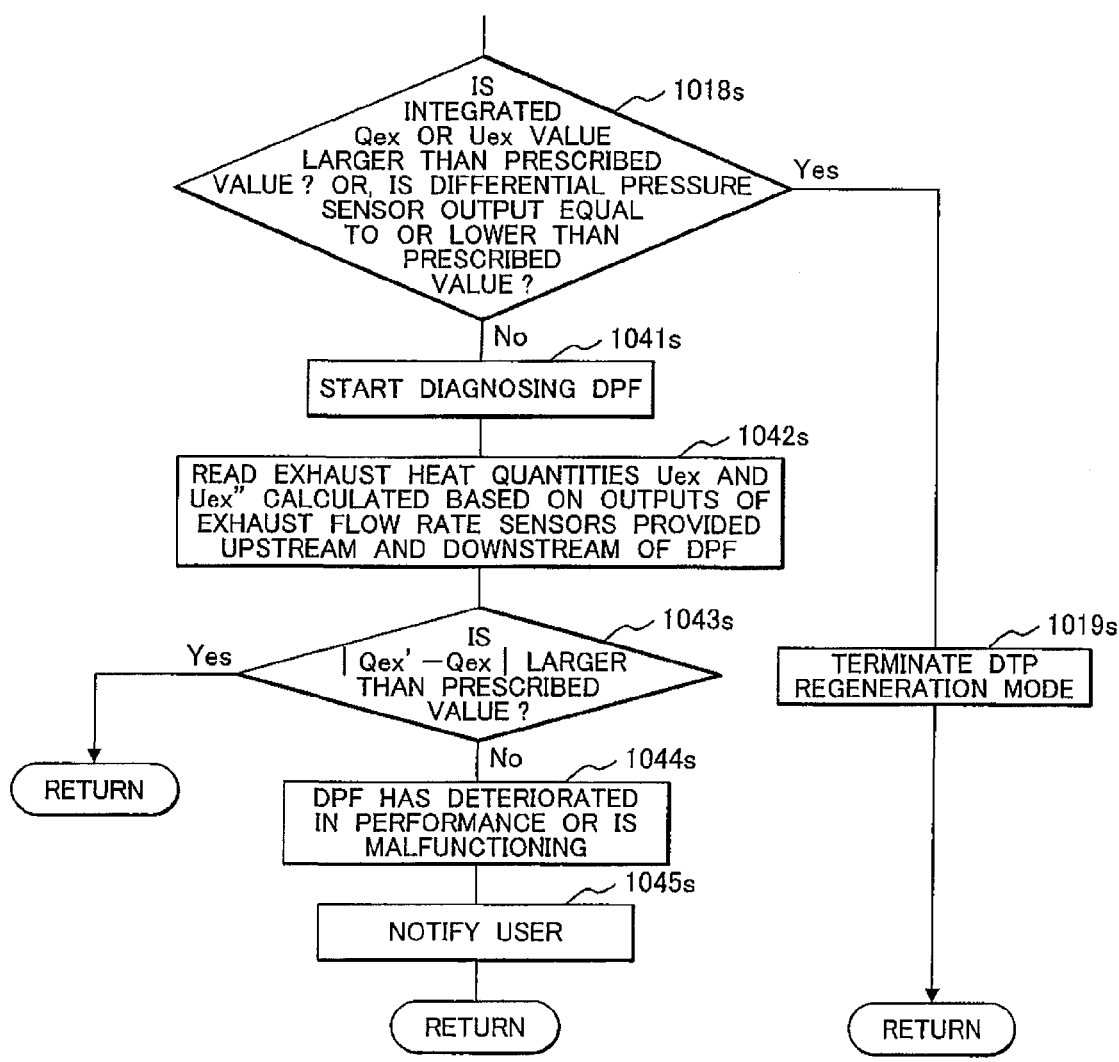
FIG. 7 is a flowchart of a method for diagnosing a DPF.

FIG. 7 is a flowchart of a method of diagnosing the DPF using the control device for an engine according to the present embodiment. Block 1018s shown in FIG. 7 is the same as block 1018s shown in FIG. 4. Namely, when the integrated value of Qex or Uex is larger than the prescribed value therefor or when the output value of the differential pressure sensor 21a or 21b is equal to or lower than the prescribed value, it is determined that the DPF has been adequately regenerated and the DPF regeneration mode is terminated (1018→Yes).

When, on the other hand, the integrated value of Qex or Uex is smaller than the prescribed value therefore or when the output value of the differential pressure sensor 21 is larger than the prescribed value (1018s→No), diagnosing the condition of the DPF is started (block 1041s).

First of all, Uex determined based on the output value of the exhaust flow rate sensor 12 disposed (immediately) upstream of the DPF 7 and Uex" determined based on the output value of the exhaust flow rate sensor 24 disposed (immediately) downstream of the DPF 7 are read (block 1042s), and whether or not the difference between Uex and Uex" is larger than the corresponding prescribed value is determined (block 1043s). When the difference between Uex and Uex" is larger than the prescribed value therefor (1043s→Yes), it is determined that soot has been appropriately purified in the DPF 7 with heat transfer taking place appropriately therein and diagnosis of the DPF is terminated. When the difference between Uex and Uex" is not larger than the prescribed value, it is determined that the DPF 7 has not been purified without heat transfer appropriately taking place between exhaust and the DPF 7 and that the DPF has deteriorated in performance or is malfunctioning (block 1044s). In this case, a notification to that effect is issued to the user (block 1045s).

In the present embodiment, in addition to the exhaust flow rate sensor installed upstream of the DPF 7, the exhaust flow rate sensor 24 is installed downstream of the DPF 7. Using the output values of these exhaust flow rate sensors makes it possible to accurately diagnose the condition of the DPF 7 and prevent deterioration of exhaust quality.

With the exhaust flow rate sensor 24 installed downstream of the DPF 7, even when the exhaust flow rate sensor 12 installed upstream of the DPF 7 goes out of order or even when the exhaust flow rate sensor 12 is not installed, the DPF 7 can be diagnosed as shown in FIG. 7 by applying the above calculated value Qex' or Uex'.

Even though the catalyst 7 used in the first and second embodiments has been described as a DPF for capturing and purifying soot in exhaust, the present invention is effective also when a catalyst (for example, NOx or SCR) for which direct sensing of an exhaust flow rate and exhaust heat calculation is effective is used and can contribute for the purpose of purifying exhaust from such an engine system.

DESCRIPTION OF SYMBOLS

2 . . . Air flow sensor
3 . . . λ sensor
5 . . . Injector
7 . . . Catalyst (DPF)
8 . . . ECU
12 . . . Exhaust flow rate sensor (upstream of DPF)
15 . . . Fuel tank
19 . . . Engine
24 . . . Exhaust flow rate sensor (downstream of DPF)

The invention claimed is:

1. A control device for an engine comprising:
an intake air flow rate sensor for sensing a flow rate of air taken into an engine;
an exhaust flow rate sensor that directly senses a flow rate of exhaust from the engine;
an exhaust temperature estimating device that senses or estimates a temperature of exhaust from the engine;
an intake air flow rate control device that controls a flow rate of air taken into the engine;
a fuel supply device that supplies fuel to the engine;
a first exhaust heat quantity estimating device for estimating an quantity of exhaust heat from the engine based on an output of the exhaust flow rate sensor and an output of the exhaust temperature estimating device;
a second exhaust heat quantity estimating device that estimates an quantity of exhaust heat from the engine based on an output of the intake air flow rate sensor and an output of the exhaust temperature estimating device; and
an operating condition determination device that determines an operating condition of the engine,
wherein an exhaust heat quantity is estimated by interchangeably using the first exhaust heat quantity estimating device and the second exhaust heat quantity estimating device; and
wherein, when the difference between an output of the first exhaust heat quantity estimating device and an output of the second exhaust heat quantity estimating device exceeds a prescribed value and the exhaust flow rate sensor is determined to be malfunctioning by the operating condition determination device, exhaust heat quantity estimation based on the first exhaust heat quantity estimating device is prohibited and the intake air flow rate control device and the fuel supply device are controlled based on a result of estimation by the second exhaust heat quantity estimating device.

2. The control device for an engine according to claim 1, further comprising an engine parameter storage device for storing parameters for controlling the engine,
wherein the engine parameter storage device stores a target exhaust heat quantity set in advance for each operating condition of the engine; and the intake air flow rate control device and the fuel supply device are controlled such that an exhaust heat quantity estimated by either the first or second exhaust heat quantity estimating device selected by interchange becomes equal to the target exhaust heat quantity.

3. The control device for an engine according to claim 1, wherein the exhaust flow rate sensor is a hot-wire flow rate sensor.

4. The control device for an engine according to claim 1, wherein the exhaust flow rate sensor is installed upstream of the catalyst.

5. The control device for an engine according to claim 4, wherein the temperature estimating device is installed downstream of the catalyst.

6. A control device for an engine, comprising:
an intake air flow rate sensor for sensing a flow rate of air taken into an engine;
an exhaust flow rate sensor that directly senses a flow rate of exhaust from the engine;
an exhaust temperature estimating device that senses or estimates a temperature of exhaust from the engine;
an intake air flow rate control device that controls a flow rate of air taken into the engine;
a fuel supply device that supplies fuel to the engine;
a first exhaust heat quantity estimating device for estimating an quantity of exhaust heat from the engine based on an output of the exhaust flow rate sensor and an output of the exhaust temperature estimating device;
a second exhaust heat quantity estimating device that estimates an quantity of exhaust heat from the engine based on an output of the intake air flow rate sensor and an output of the exhaust temperature estimating device;
an operating condition determination device that determines an operating condition of the engine; and
an exhaust oxygen concentration estimating device that senses or estimate an oxygen concentration of exhaust from the engine,
wherein an exhaust heat quantity is estimated by interchangeably using the first exhaust heat quantity estimating device and the second exhaust heat quantity estimating device; and
wherein, when the difference between an output of the first exhaust heat quantity estimating device and an output of the second exhaust heat quantity estimating device exceeds a first prescribed value and an output of the exhaust oxygen concentration estimating device exceeds a second prescribed value, exhaust heat quantity estimation based on the first exhaust heat quantity estimating device is prohibited and regeneration control for the exhaust flow rate sensor is performed.

7. The control device for an engine according to claim 6, further comprising a catalyst that captures at least either soot or NOx present in exhaust from the engine and exhaust oxygen concentration estimating device that senses or estimates an oxygen concentration in exhaust from the engine,
  wherein, during catalyst regeneration mode for purifying soot and/or NOx captured by the catalyst, the operating condition of the engine is controlled based on an output of either the first or second exhaust heat quantity estimating device selected by interchange and an output of the exhaust oxygen concentration estimating device.

8. The control device for an engine according to claim 7, wherein, during the catalyst regeneration mode, whether to continue or terminate the catalyst regeneration mode is determined based on an output or an integrated output value of the exhaust heat quantity estimating device.

9. The control device for an engine according to claim 7, wherein, before the catalyst regeneration mode is started, exhaust heat quantity estimation based on an output value of the exhaust flow rate sensor is prohibited and regeneration control for the exhaust flow rate sensor is performed.

10. The control device for an engine according to claim 7, wherein, after the catalyst regeneration mode is terminated, exhaust heat quantity estimation based on an output value of the exhaust flow rate sensor is prohibited and regeneration control for the exhaust flow rate sensor is performed.

* * * * *